US012682923B1

(12) United States Patent

Mammei et al.

(10) Patent No.: US 12,682,923 B1

(45) Date of Patent: Jul. 14, 2026

(54) BALLAST CIRCUIT FOR STABILIZING SUPPLY VOLTAGES IN HIGH-SPEED CIRCUITS

(71) Applicant: STMicroelectronics International N.V., Geneva (CH)

(72) Inventors: Enrico Mammei, Vittuone (IT); Matteo Alessio Traldi, Milan (IT); Paolo Pulici, Lainate Mi (IT); Marco Bigi, Reggio Emilia (IT)

( * ) Notice: Subject to any disclaimer, the term of this patent is extended or adjusted under 35 U.S.C. 154(b) by 13 days.

(21) Appl. No.: 19/039,159

(22) Filed: Jan. 28, 2025

(51) Int. Cl.
    *G11B 20/10*     (2006.01)
    *G11B 5/02*     (2006.01)
    *G11B 5/00*     (2006.01)

(52) U.S. Cl.
    CPC ...... *G11B 5/022* (2013.01); *G11B 2005/0008* (2013.01)

(58) Field of Classification Search
    CPC ...... G11B 20/10027; G11B 2005/0018; G11B 5/02; G11B 5/012; G11B 20/10046; G11B 5/035
    USPC ................................................... 360/68, 65
    See application file for complete search history.

(56) References Cited

U.S. PATENT DOCUMENTS

| | | | |
|---|---|---|---|
| 2002/0038191 A1 | 3/2002 | Ko | |
| 2003/0081339 A1* | 5/2003 | Barnett | ............... G11B 5/5526 |
| 2004/0032682 A1 | 2/2004 | Leighton | |
| 2005/0190476 A1 | 9/2005 | Wilson | |
| 2013/0250657 A1 | 9/2013 | Haukness | |

* cited by examiner

*Primary Examiner* — Nabil Z Hindi

(74) *Attorney, Agent, or Firm* — Slater Matsil, LLP

(57) ABSTRACT

According to an embodiment, a system includes a writer circuit of a pre-amplifier coupled between first and second pre-amplifier supply voltages and configured to generate a write current. A ballast circuit couples in parallel with the writer circuit between first and second supply voltages. The ballast circuit generates first and second ballast currents in response to a write enable signal and injects them into the pre-amplifier supply voltages to pre-charge parasitic inductances before the writer circuit generates the write current. The ballast circuit includes a programmable delay circuit that generates a timing pulse matching a propagation delay of the writer circuit, and a configurable current mirror circuit that generates the ballast currents. The ballast currents are de-asserted when the writer circuit begins generating the write current.

20 Claims, 7 Drawing Sheets

800

700

| 702 | GENERATE A PULSE WITH PROGRAMMABLE DURATION |
| 704 | GENERATE BALLAST CURRENT |
| 706 | INJECT BALLAST CURRENT PULSE |
| 708 | DE-ASSERT BALLAST CURRENT PULSES |

BALLAST CIRCUIT FOR STABILIZING SUPPLY VOLTAGES IN HIGH-SPEED CIRCUITS

TECHNICAL FIELD

The present disclosure generally relates to electronic devices and, in particular embodiments, to a ballast circuit for stabilizing supply voltages in high-speed circuits.

BACKGROUND

In modern hard disk drives (HDDs), data is written to and read from magnetic disks using read/write heads positioned close to the disk surface. The read/write heads are coupled to a preamplifier circuit that interfaces the heads with other HDD control circuitry.

The preamplifier typically includes a writer circuit that provides a write current to the write head during write operations. The write current generates a magnetic field that magnetizes regions of the disk to store data bits. The writer circuit operates at high switching speeds to achieve high data rates, rapidly turning the write current on and off.

HDDs can also include a flexible printed circuit assembly (flex circuit) that provides electrical connections between the preamplifier and other components, such as the read/write heads and HDD controller. The flex circuit includes conductive traces that carry signals and power between the connected components.

The preamplifier and writer circuit are supplied with power from supply voltages. These supply voltages are typically provided through the flex circuit from power supply circuitry elsewhere in the HDD. Bypass capacitors may be included near the preamplifier to help stabilize the supply voltages.

However, the high-speed switching of the writer circuit can cause disturbances in the supply voltages. In particular, when the writer circuit transitions from a read mode to a write mode, it can draw a large write current from the supply voltages. The sudden increase in current interacts with parasitic inductances and capacitances in the supply network, such as those associated with the flex circuit and bypass capacitors, leading to supply voltage fluctuations.

Supply voltage disturbances can affect the performance of the writer circuit and other sensitive circuits in the preamplifier. For example, voltage drops or oscillations during the initial write current switching can cause timing errors or phase shifts in the write current waveform. This may lead to inaccurate magnetization of data bits on the disk, increasing bit error rates.

SUMMARY

Technical advantages are generally achieved by embodiments of this disclosure, which describe a ballast circuit for stabilizing supply voltages in high-speed circuits.

A first aspect relates to a system, comprising a writer circuit of a pre-amplifier, the writer circuit coupled between a first pre-amplifier supply voltage and a second pre-amplifier supply voltage and configured to generate a write current; and a ballast circuit coupled in parallel with the writer circuit, the ballast circuit coupled between a first supply voltage and a second supply voltage and configured to generate first and second ballast currents in response to a write enable signal, inject the first and second ballast currents into the first and second pre-amplifier supply voltages to pre-charge parasitic inductances before the writer circuit generates the write current, and de-assert the first and second ballast currents in response to the writer circuit generating the write current.

A second aspect relates to a method, comprising generating first and second ballast currents from a first supply voltage and a second supply voltage in response to a write enable signal; injecting the first and second ballast currents into first and second pre-amplifier supply voltages to pre-charge parasitic inductances before a writer circuit of a pre-amplifier generates a write current, wherein the writer circuit is coupled between the first pre-amplifier supply voltage and the second pre-amplifier supply voltage; and de-asserting the first and second ballast currents in response to the writer circuit generating the write current.

A third aspect relates to a ballast circuit, comprising a programmable delay circuit configured to receive a write enable signal, and generate a timing pulse having a duration matching a propagation delay of a writer circuit; and a configurable current mirror circuit coupled between a first supply voltage and a second supply voltage, the configurable current mirror circuit configured to generate first and second ballast currents in response to the timing pulse, inject the first and second ballast currents into first and second pre-amplifier supply voltages to pre-charge parasitic inductances before the writer circuit generates a write current, and de-assert the first and second ballast currents in response to the writer circuit generating the write current.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
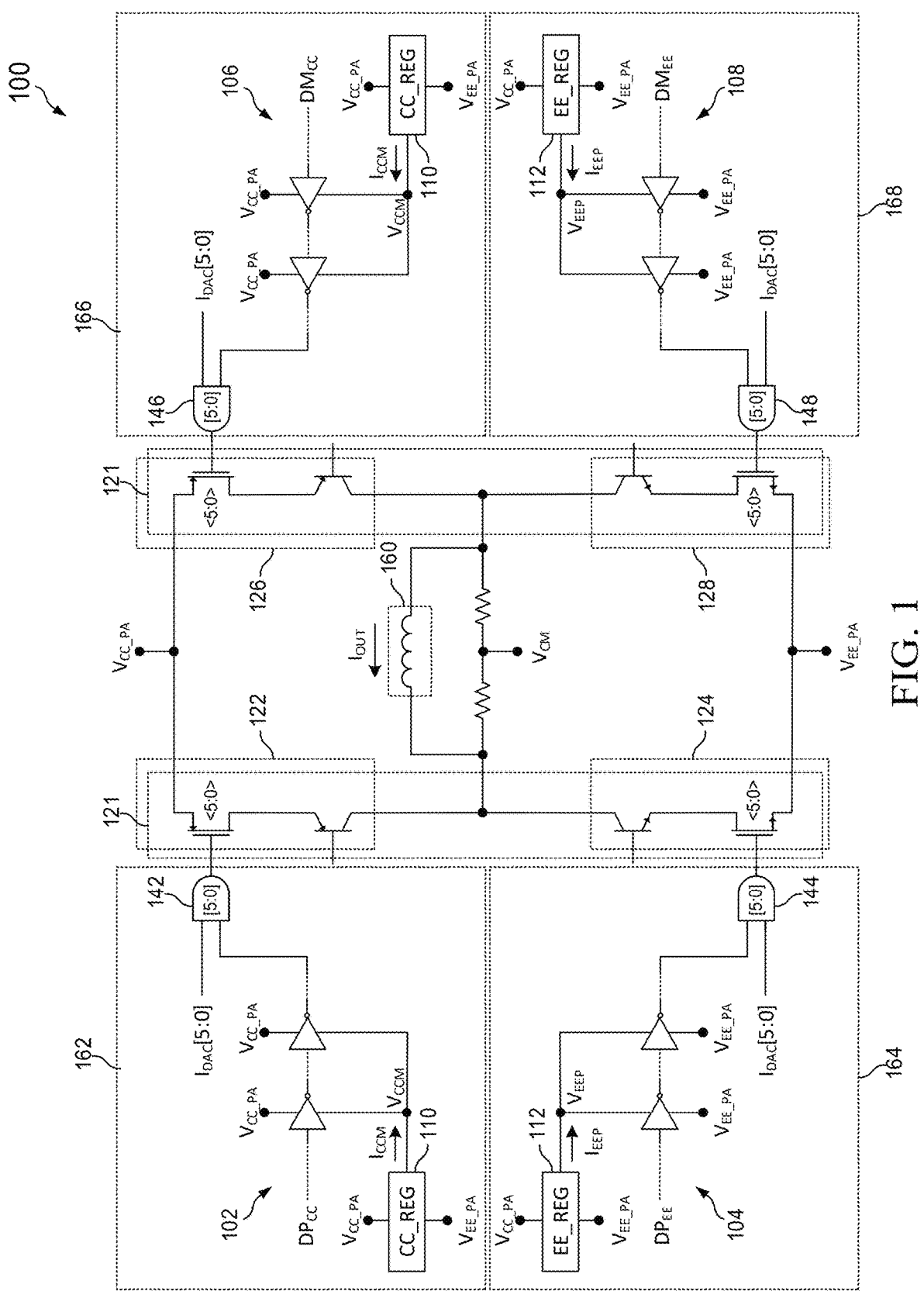
FIG. 1 is a simplified schematic of an output stage of a writer circuit.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of hard disk drive preamplifiers, it should also be appreciated that these inventive aspects may also apply to other high-speed circuits that experience supply voltage disturbances due to fast switching currents interacting with reactive supply networks. In particular, aspects of this disclosure may similarly apply to circuits such as high-speed line drivers, laser diode drivers, power amplifiers, and switching regulators.

Embodiments of the present disclosure provide a ballast circuit for reducing supply voltage disturbances in high-speed circuits, such as those found in hard disk drive preamplifiers. The ballast circuit is coupled in parallel with a writer circuit between a first supply voltage and a second supply voltage. It includes a programmable delay circuit and a configurable current mirror circuit to generate precisely timed current pulses on the supply voltages.

The programmable delay circuit receives a write signal and generates a pulse with a duration that matches the propagation delay of the writer circuit. In response to the delay circuit, the configurable current mirror circuit's pulse generates a first and second ballast current pulse. These ballast current pulses are timed to start just before the writer circuit draws a large write current from the supply voltages, such as during a read-to-write transition.

By injecting the ballast current pulses onto the supply voltages slightly before the writer circuit's current demand, the ballast circuit pre-charges the parasitic inductances and capacitances in the supply network, including those associated with the flex circuit and bypass capacitors. The pre-charging mechanism reduces the supply voltage droops and oscillations that can otherwise occur when the writer circuit's current abruptly increases. As a result, the ballast circuit helps maintain stable supply voltages during the critical initial switching period, improving the accuracy and reliability of the writer circuit.

In embodiments, the programmable delay circuit and configurable current mirror circuit provide adjustability to optimize the timing and amplitude of the ballast current pulses. The flexibility allows the ballast circuit to be tuned for specific circuit characteristics and operating conditions, ensuring consistent performance across different designs and environments.

The ballast circuit offers several advantages over conventional solutions. It can be implemented using relatively simple and compact circuitry suitable for integration with the preamplifier, minimizing area and cost overhead. The ballast circuit can also be disabled when not needed, conserving power. By actively compensating for supply voltage transients at their source, the ballast circuit can relax design requirements for the supply network and bypass capacitors, potentially saving cost and space. These and additional details are further discussed below.

FIG. 1 illustrates a simplified schematic of an output stage of a writer circuit 100, which can be used in a hard disk drive application. In a hard disk drive, the write circuit provides a high-speed current signal to a magnetic head, which generates a magnetic field capable of storing bits on a disk. The disk can be read from or written multiple times, with a fast transition between read and write modes, typically occurring in less than ten nanoseconds.

Writer circuit 100 includes four digital-to-analog converters (DACs) arranged in an NPN-PNP H-bridge configuration. Each digital-to-analog converter receives corresponding differential data (e.g., $DP_{CC}$, $DM_{CC}$, $DP_{EE}$, and $DM_{EE}$) via logic chains (e.g., a first logic chain 102, a second logic chain 104, a third logic chain 106, and a fourth logic chain 108). The output current ($I_{OUT}$) is generated based on the received differential data and with a magnitude based on a digital-to-analog converter code ($I_{DAC}$) provided to the input of the AND gates (e.g., a first AND gate 142, a second AND gate 144, a third AND gate 146, and a fourth AND gate 148).

The output current ($I_{OUT}$) is provided through an output stage 121 from each branch to load 160. The load 160 can be a magnetic head for writing a disk. The direction of the output current ($I_{OUT}$) at load 160 is determined by enabling branches in the NPN-PNP H-bridge configuration.

For example, if the bottom left branch 164 and the top right branch 166 of the NPN-PNP H-bridge are enabled, the current flows from the right to the left (i.e., as shown in FIG. 1). In contrast, if the top left branch 162 and the bottom right branch 168 of the NPN-PNP H-bridge are enabled, the current flows from the left to the right (i.e., opposite of the direction shown in FIG. 1). Accordingly, the digital-to-analog converters within each branch of the NPN-PNP H-bridge are enabled and disabled at a high frequency to generate the output current ($I_{OUT}$) for writing data on the hard disk drive.

Each logic chain (i.e., the first logic chain 102, the second logic chain 104, the third logic chain 106, and the fourth logic chain 108) includes a plurality (e.g., 30 plus components) of (e.g., scaled CMOS devices) logic gates (e.g., AND gate(s), OR gate(s), NAND gate(s), NOR gate(s), XOR gate(s), XNOR gate(s), inverter(s), and/or buffer(s)) connected in a chain. The first logic chain 102 and the third logic chain 106 act as a driving stage to drive the output digital-to-analog converter at each branch of the NPN-PNP H-bridge.

The high-side linear voltage regulator (CC_REG) 110 provides a high-side supply voltage ($V_{CCM}$) to the logic gates of the first logic chain 102 and the third logic chain 106. The low-side linear voltage regulator (EE_REG) 112 provides a low-side supply voltage (VEEP) to the logic gates of the second logic chain 104 and the fourth logic chain 108.

As the first logic chain 102, the second logic chain 104, the third logic chain 106, and the fourth logic chain 108 switch, the high-side linear voltage regulator (CC_REG) 110 and the low-side linear voltage regulator (EE_REG) 112 may each provide over 100 mA of current or more (e.g., 150 mA or more) to the logic gates of the first logic chain 102, the second logic chain 104, the third logic chain 106, and the fourth logic chain 108.

In some embodiments, the data transfer data rate may be 4 Gbps, but other data rates, such as 6 Gbps, are also possible. Accordingly, the logic gates are configured to switch at high data rates, such as 4 Gbps.

In embodiments, the digital-to-analog converter code ($I_{DAC}$) includes six bits. Thus, as shown, six AND gates drive the first drive circuit 122, the second drive circuit 124, the third drive circuit 126, and the fourth drive circuit 128. In some embodiments, the digital-to-analog converter code ($I_{DAC}$) may include more than 6 bits, such as 7 bits, 8 bits, or more, or less than 6 bits, such as 5 bits or less.

In embodiments, the positive pre-amplifier supply voltage ($V_{CC\_PA}$) may be, for example, 5V. Accordingly, the high-side linear voltage regulator (CC_REG) 110 is configured to generate the high-side supply voltage ($V_{CCM}$), which is lower than the positive pre-amplifier supply voltage ($V_{CC\_PA}$). In embodiments, 1V, 0.8V, 1.2V, or other voltages can be suitable for the application.

In embodiments, the negative pre-amplifier supply voltage ($V_{EE\_PA}$) may be, for example, −3V. Accordingly, the low-side linear voltage regulator (EE_REG) 112 is configured to generate the low-side supply voltage (VEEP), which is higher than the negative pre-amplifier supply voltage ($V_{EE\_PA}$). In embodiments, 1V, 0.8V, 1.2V, or other voltages can be suitable for the application. In embodiments, for example, the positive pre-amplifier supply voltage ($V_{CC\_PA}$) can be 5V, the high-side supply voltage ($V_{CCM}$) can be 4V, the negative pre-amplifier supply voltage ($V_{EE\_PA}$) can be −3V, and the high-side supply voltage ($V_{CCM}$), can be −2V. Other voltages are also possible in embodiments.

In embodiments, the NPN-PNP H-bridge is switched on with high-speed CMOS logic gates, with a turn-on time of a few nanoseconds (e.g., 5, 10, or 15 ns). The maximum output current value ($I_{OUT}$) can be hundreds of milliamps (e.g., 150, 200, or 250 mA).

During each read-to-write transition, a significant amount of current, on the order of 200 mA, is absorbed from the positive pre-amplifier supply voltage ($V_{CC\_PA}$) and the negative pre-amplifier supply voltage ($V_{EE\_PA}$) due to the switching and the large amount of current being provided to the load. The sudden current demand causes disturbances in the supply nodes, which can adversely affect the performance of the writer circuit 100 (e.g., first pulse of the current after the transition). Ideally, it is desirable to replicate the signal data pattern at the input of the writer circuit 100 at the output in terms of current delivered to the load. However, the drop in current due to the disturbances in the supply nodes during the transition from read to write can prevent this from happening.

For example, during the read-to-write transition, the currents associated with the positive pre-amplifier supply voltage ($V_{CC\_PA}$) and the negative pre-amplifier supply voltage ($V_{EE\_PA}$) can suddenly increase by hundreds of milliamps (e.g., 300 or 500 mA) over a few nanoseconds (e.g., 7 or 10 ns). Due to the sudden large current draw, the positive pre-amplifier supply voltage ($V_{CC\_PA}$) can drop by hundreds of millivolts (e.g., 200 or 400 mV) from, for example, 5V to 4.8V. Likewise, the negative pre-amplifier supply voltage ($V_{EE\_PA}$) can increase by hundreds of millivolts (e.g., 200 or 400 mV) from, for example, −3V to −2.8V.

As the positive pre-amplifier supply voltage ($V_{CC\_PA}$) and the negative pre-amplifier supply voltage ($V_{EE\_PA}$) are directly powering writer circuit 100, the driving structure (i.e., the first drive circuit 122, the second drive circuit 124, the third drive circuit 126, and the fourth drive circuit 128) are directly affected by the sudden voltage transitions. Further, as the high-side linear voltage regulator (CC_REG) 110 and the low-side linear voltage regulator (EE_REG) 112 are regulated voltages that are generated from the positive pre-amplifier supply voltage ($V_{CC\_PA}$) and the negative pre-amplifier supply voltage ($V_{EE\_PA}$), the sudden transitions of these supply nodes affect each branch of the NPN-PNP H-bridge.

Accordingly, a phase shift of the high-speed current can occur at the beginning of the read-to-write transition due to the aforementioned disturbances in the supply nodes. Phase shift refers to the deviation of the crossing point of a square signal compared to its ideal crossing point. This phenomenon can happen when all the circuits and supplies try to reach a steady-state condition during the initial transition period.

The phase shift of the high-speed current is directly related to the system's Bit Error Rate (BER), which is strongly influenced by the disturbances in the supply nodes. When there is a phase shift in the signal, the density of the first bits written on the disk is lower than the ideal scenario. Consequently, minimizing the phase shift is advantageous for maintaining a low Bit Error Rate (BER) and ensuring reliable data storage.

Another reason why it would be advantageous to minimize the phase shift is that during the initial phase of a write operation, the system writes timing information (clock data) to the disk. This clock data is a reference for all subsequent data written to and read from the disk. The accuracy of this initial clock writing establishes the timing framework for interpreting all subsequent data. Any phase shifting or timing errors in this clock data can propagate through the system, increasing bit error rates during write and read operations.

Figure 2:
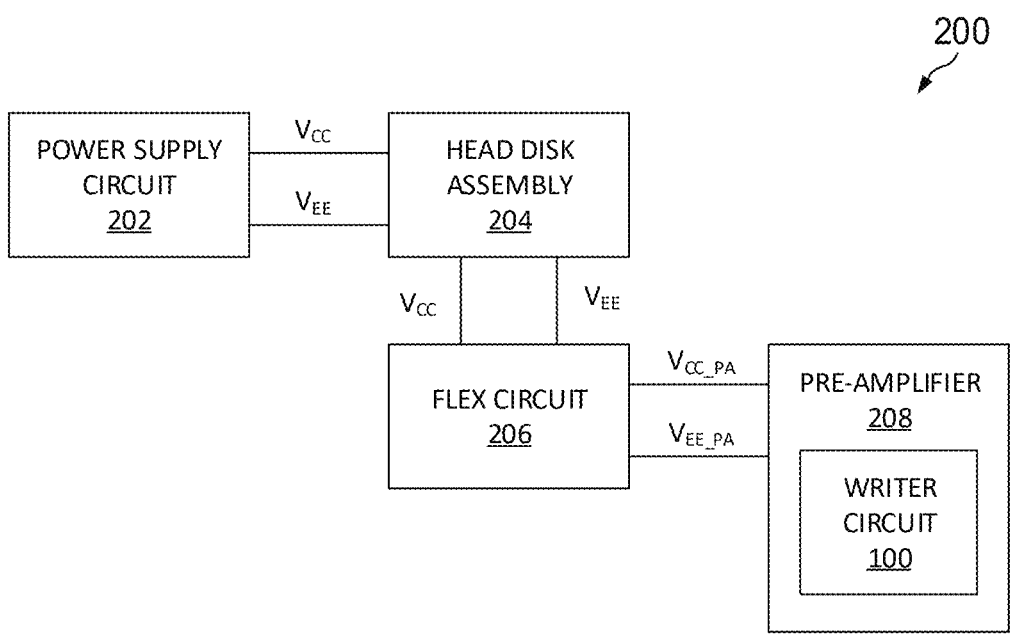
FIG. 2 is a block diagram of an embodiment supply voltage management system for a hard disk drive.

FIG. 2 illustrates a block diagram of an embodiment supply voltage management system 200 for a hard disk drive. The supply voltage management system 200 includes a power supply circuit 202, a head disk assembly (HDA) connector 204, a flex circuit 206, and a pre-amplifier 208, which may (or may not) be arranged as shown. The power supply circuit 202 generates the positive supply voltage ($V_{CC}$) and the negative supply voltage ($V_{EE}$), which is delivered to the flex circuit 206 through the head disk assembly (HDA) connector 204. The flex circuit 206 provides the positive pre-amplifier supply voltage ($V_{CC\_PA}$) and the negative pre-amplifier supply voltage ($V_{EE\_PA}$) to the pre-amplifier 208, which can include the writer circuit 100. The supply voltage management system 200 may include additional components not shown, such as power storage components (e.g., capacitors).

The power supply circuit 202 (a power combo or power supply assembly) is an integrated component within the hard disk drive that combines multiple power management functions into a single circuit. It is configured to provide a centralized solution for generating, regulating, and distributing the necessary power supply voltages to the various components within the hard disk drive, ensuring their proper operation and performance.

The power supply circuit 202 can include an AC-DC converter, which rectifies and filters the incoming alternating current (AC) from the mains supply and converts it to a suitable direct current (DC) voltage. The DC voltage serves as the input for the subsequent stages. The DC voltage can be processed by one or more DC-DC converters, which step the voltage up or down to generate the specific voltage levels required by different components within the hard disk drive. These voltage levels may include the positive supply voltage ($V_{CC}$) and the negative supply voltage ($V_{EE}$), which can power the writer circuit 100 and other components.

The power supply circuit 202 can incorporate voltage regulators to ensure stable operation of the hard disk drive electronics. The regulators maintain constant output voltages despite input voltage or load current fluctuations. They can minimize voltage ripple and noise, providing a clean and reliable power supply to the various components.

The power supply circuit 202 may include protection circuits to safeguard the hard disk drive from potential power supply anomalies. These protection features can include overvoltage protection, which can prevent damage from excessive voltage levels; undervoltage protection, which shuts down the system if the voltage drops below a certain threshold; and overcurrent protection, which limits the current drawn by the components to prevent damage from short circuits or other faults.

By consolidating the power management functions into a single circuit, the power supply circuit 202 can simplify the overall design of the hard disk drive and improve its reliability.

The power supply voltages in the system follow a hierarchical distribution scheme. The power supply circuit 202 generates the primary supply voltages: the positive supply voltage ($V_{CC}$) and the negative supply voltage ($V_{EE}$). These primary voltages are distributed through the head disk assembly (HDA) connector 204 to the flex circuit 206.

The flex circuit 206 delivers these voltages to the pre-amplifier 208, which become the positive pre-amplifier supply voltage ($V_{CC\_PA}$) and the negative pre-amplifier supply voltage ($V_{EE\_PA}$). While the positive pre-amplifier supply voltage ($V_{CC\_PA}$) and the negative pre-amplifier supply voltage ($V_{EE\_PA}$) are derived from the positive supply voltage ($V_{CC}$) and the negative supply voltage ($V_{EE}$) respectively, they are considered separate supply nodes due to the parasitic elements introduced by the flex circuit 206.

In embodiments, the head disk assembly (HDA) connector 204 is an electrical connector that provides a reliable, high-density, and compact connection between the head disk assembly and the flex circuit 206. It is responsible for carrying electrical signals and power between these components. Head disk assembly (HDA) connector 204 typically includes connections for read/write signals, servo signals, motor control signals, and power supply voltages.

The head disk assembly (HDA) connector 204 ensures proper signal and power transmission while minimizing signal integrity issues, such as crosstalk and electromagnetic interference (EMI). The head disk assembly (HDA) connector 204 delivers the positive supply voltage ($V_{CC}$) and the negative supply voltage ($V_{EE}$) from the power supply circuit 202 to the flex circuit 206.

In addition to the disturbances during the transition from read to write at the writer circuit 100, the flex circuit 206 can adversely affect the positive pre-amplifier supply voltage ($V_{CC\_PA}$) and the negative pre-amplifier supply voltage ($V_{EE\_PA}$) supply. The transfer function of the flex circuit 206 affects the supply voltages provided to the pre-amplifier 208. When the writer circuit 100 in the pre-amplifier 208 is switched on, the writer circuit 100 writes data to the magnetic disk within approximately ten nanoseconds. During this data transition, the current absorbed from the positive pre-amplifier supply voltage ($V_{CC\_PA}$) and the negative pre-amplifier supply voltage ($V_{EE\_PA}$) supply changes rapidly.

The interaction of the absorbed currents with the positive supply voltage ($V_{CC}$) and the negative supply voltage ($V_{EE}$) distribution paths on the flex circuit 206 can cause disturbances in the positive pre-amplifier supply voltage ($V_{CC\_PA}$) and the negative pre-amplifier supply voltage ($V_{EE\_PA}$) before they can recover.

As a result of the supply voltage disturbances, the initial zero-crossing points of the output current ($I_{OUT}$) of the writer circuit 100 may no longer be aligned with the input data pattern, leading to phase-shifting. This phase-shifting can adversely affect the ability of the writer circuit 100 to accurately write data to the magnetic disk, potentially increasing the system's bit error rate.

Supply voltage management systems can include bypass capacitors to help stabilize the supply voltages provided to the pre-amplifier 208. However, space constraints in the hard disk drive assembly require the bypass capacitors to be placed at a distance from the pre-amplifier 208. At high operating frequencies, such as 2.5 GHZ, this physical separation reduces the effectiveness of the bypass capacitors in maintaining stable supply voltages. As a result, the bypass capacitors cannot adequately filter noise and fluctuations from the positive pre-amplifier supply voltage ($V_{CC\_PA}$) and the negative pre-amplifier supply voltage ($V_{EE\_PA}$).

Figure 3:
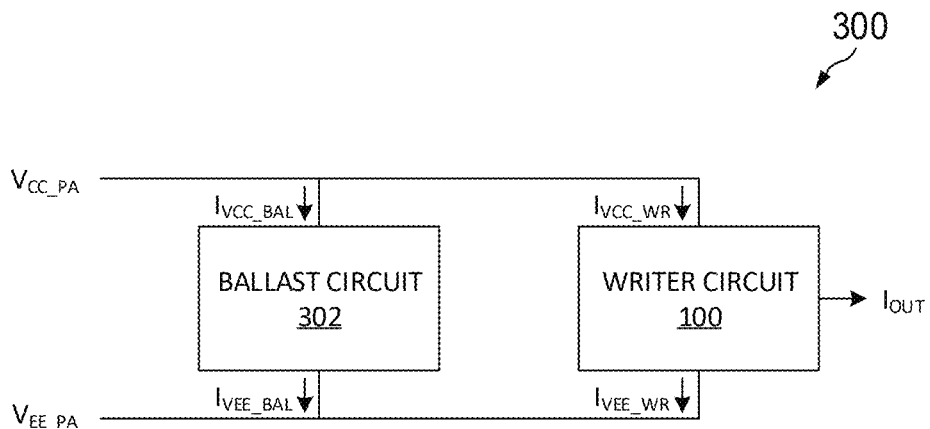
FIG. 3 is a block diagram of an embodiment ballast system.
Figure 4:
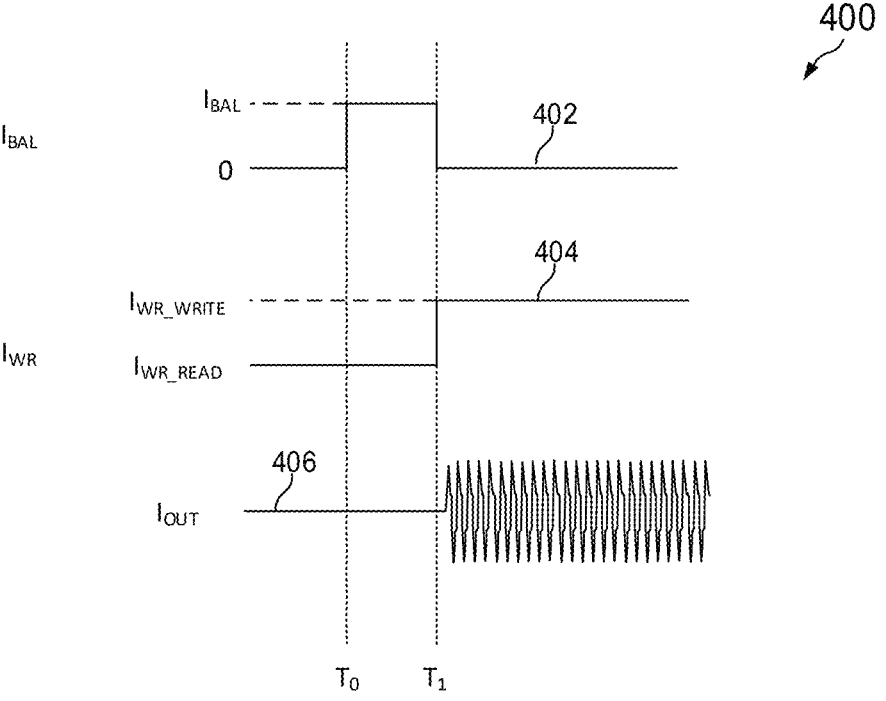
FIG. 4 is an embodiment timing diagram of the operation of the ballast system of FIG. 3.

FIG. 3 illustrates a block diagram of an embodiment ballast system 300. FIG. 4 illustrates an embodiment timing diagram 400 of the operation of the ballast system 300. The ballast system 300 includes a ballast circuit 302 and the writer circuit 100, which may (or may not) be arranged as shown. Ballast system 300 may include additional components not shown. The timing diagram 400 shows the timing between the ballast current ($I_{BAL}$) 402, the write current ($I_{WR}$) 404, and the output current ($I_{OUT}$) 406.

The ballast circuit 302 generates its ballast currents using the positive supply voltage ($V_{CC}$) and the negative supply voltage ($V_{EE}$) as sources but injects these currents to stabilize the positive pre-amplifier supply voltage ($V_{CC\_PA}$) and the negative pre-amplifier supply voltage ($V_{EE\_PA}$) at the pre-amplifier 208. This arrangement allows the ballast circuit 302 to compensate for the voltage drops and disturbances along the supply path through the flex circuit 206.

The bypass capacitors in the supply voltage management system include parasitic elements that affect their performance at high frequencies. These parasitic elements include equivalent series inductance (ESL) and equivalent series resistance (ESR). The equivalent series inductance represents the inherent inductance of the capacitor's internal structure and connections. In contrast, the equivalent series resistance represents the total effective resistance in series with the ideal capacitor.

When the writer circuit 100 demands a sudden change in current during a read-to-write transition, these parasitic elements limit the bypass capacitors' ability to respond quickly. The equivalent series inductance requires a certain amount of time to allow current changes, creating an inductive voltage drop during rapid current transitions. Similarly, the equivalent series resistance causes voltage drops proportional to the current flowing through the capacitor. These effects, combined with the physical separation between the bypass capacitors and the pre-amplifier 208, reduce the effectiveness of the bypass capacitors in maintaining stable supply voltages at high frequencies. The ballast circuit 302 helps compensate for these limitations by pre-charging the parasitic inductances and managing the voltage drops before the writer circuit 100 begins its operation.

The ballast circuit 302 reduces the initial phase shifting in the output current ($I_{OUT}$) 406 of the writer circuit 100 by stabilizing the supply voltages during the switching period. Phase shifting occurs when the writer circuit 100 transitions from a read mode to a write mode, causing a sudden increase in current drawn from the positive pre-amplifier supply voltage ($V_{CC\_PA}$) and the negative pre-amplifier supply voltage ($V_{EE\_PA}$). The rapid change in current interacts with the parasitic inductances and capacitances in the supply network, such as those associated with the flex circuit 206 and bypass capacitors, leading to supply voltage fluctuations that can affect the timing of the output current ($I_{OUT}$) 406.

To mitigate this issue, the ballast circuit 302 is coupled in parallel with the writer circuit 100. The ballast circuit 302 is coupled between the positive pre-amplifier supply voltage ($V_{CC\_PA}$) and the negative pre-amplifier supply voltage ($V_{EE\_PA}$), which, in embodiments, can be provided by the flex circuit 206. The ballast circuit 302 generates timed current pulses that intentionally disturb the supply voltages just before the writer circuit 100 begins drawing the large write current. By doing so, the ballast circuit 302 pre-charges the parasitic inductances and capacitances in the supply network, reducing voltage fluctuations when the writer circuit 100 switches on.

The ballast circuit 302 generates precisely timed current pulses anticipating the write current transitions during read-to-write operations. At time $T_0$, the ballast circuit 302 begins exciting the flex circuit 206 with the ballast current ($I_{BAL}$) 402. The duration between $T_0$ and $T_1$ and the amplitude of the ballast current ($I_{BAL}$) 402 are calibrated to match the characteristics of the writer circuit 100. This timing ensures that when the writer circuit 100 begins delivering current to the load at time $T_1$, the supply voltages have been pre-conditioned to a stable state, reducing disturbances in the positive write current ($I_{VCC\_WR}$) and the negative write current ($I_{VEE\_WR}$).

Further, the ballast circuit 302 pre-charges the parasitic inductances in the supply network before the writer circuit 100 begins drawing current. Since inductors require time to store energy and reach their steady-state condition, the ballast current ($I_{BAL}$) 402 is initiated before the write operation. Accordingly, the supply network is better prepared when the writer circuit 100 draws current by pre-charging these parasitic inductances to their required energy levels. This pre-charging mechanism helps minimize voltage drops and allows faster recovery of the supply voltages during the critical read-to-write transition.

The ballast circuit 302 is configured to generate the timed current pulses that are synchronized in time with the pulse transitions of the positive write current ($I_{VCC\_WR}$) and the negative write current ($I_{VEE\_WR}$) of the write current ($I_{WR}$) 404 during the read-to-write transition and the current consumption by the load at the writer circuit 100. To do this, the flex circuit 206 is excited in advance at time $T_0$, considering the current consumption by the load such that the duration ($\Delta t$) corresponding to the difference between time $T_1$ and time $T_0$, and the amplitude of the ballast current ($I_{BAL}$) 402, such that the writer circuit 100 at time $T_1$ starts delivering current with a stable voltage supply.

The ballast circuit 302 generates the ballast current ($I_{BAL}$) 402, which includes a positive ballast current ($I_{VCC\_BAL}$) drawn from the positive pre-amplifier supply voltage ($V_{CC\_PA}$) and a negative ballast current ($I_{VEE\_BAL}$) drawn from the negative pre-amplifier supply voltage ($V_{EE\_PA}$). The ballast current ($I_{BAL}$) 402 represents the positive ballast current ($I_{VCC\_BAL}$) and the negative ballast current ($I_{VEE\_BAL}$), which transition from zero to the positive ballast current ($I_{BAL}$) at time $T_0$ and fall from the positive ballast current ($I_{BAL}$) to zero at time $T_1$.

The write current ($I_{WR}$) 404 represents the current drawn by the writer circuit 100 from the positive pre-amplifier supply voltage ($V_{CC\_PA}$) and the negative pre-amplifier supply voltage ($V_{EE\_PA}$) during the write operation. The positive write current ($I_{VCC\_WR}$) and the negative write current ($I_{VEE\_WR}$) have the same general shape as shown by the write current ($I_{WR}$) 404. Until Time $T_1$, the write current ($I_{WR}$) 404 is equal to the read current ($I_{WR\_READ}$), which is the current absorbed by the writer circuit 100 during read operations. At time $T_1$, the write current ($I_{WR}$) 404 transitions to the write current ($I_{WR\_WRITE}$), which is the current absorbed by the writer circuit 100 during write operations.

The output current ($I_{OUT}$) 406 is the resulting current delivered by the writer circuit 100 to the load, such as the magnetic write head.

The falling edge of the ballast current ($I_{BAL}$) 402 is synchronized with the rising edge of the write current ($I_{WR}$) 404 at time $T_1$ with minimal gaps and overlap to avoid multiple current sources on the flex circuit 206.

As shown in FIG. 4, the ballast circuit 302 asserts the ballast current ($I_{BAL}$) 402 in response to the writer circuit 100 is switched ON at time $T_0$, which is slightly before the writer circuit 100 begins drawing the write current ($I_{WR}$) 404 at time $T_1$. The ballast current ($I_{BAL}$) 402 transitions from zero to the positive ballast current ($I_{BAL}$), disturbing the supply voltages in a controlled manner. At time $T_1$, when the writer circuit 100 starts delivering the output current ($I_{OUT}$) 406 to the load, the ballast circuit 302 de-asserts the ballast current ($I_{BAL}$) 402, transitioning from the positive ballast current ($I_{BAL}$) to zero.

The timing and amplitude of the ballast current ($I_{BAL}$) 402 impacts the effectiveness of the ballast circuit 302. The pulse characteristics of the ballast current ($I_{BAL}$) 402 are configured to match the timing and amplitude characteristics of the writer circuit 100. By injecting the ballast current pulses at the optimal time and with the appropriate magnitude, the ballast circuit 302 can effectively pre-charge the supply network, minimizing the voltage fluctuations and reducing the initial phase shifting in the output current ($I_{OUT}$) 406.

The intentional disturbing of the supply voltages by the ballast circuit 302 results in improved stability for the positive pre-amplifier supply voltage ($V_{CC\_PA}$), the negative pre-amplifier supply voltage ($V_{EE\_PA}$), and the output current ($I_{OUT}$). By reducing the supply voltage fluctuations during the switching period, the ballast circuit 302 helps maintain the proper timing of the output current ($I_{OUT}$) 406, minimizing phase shifting and improving the overall performance of the writer circuit 100. This, in turn, leads to more accurate data writing and lower bit error rates in the hard disk drive system.

Figure 5:
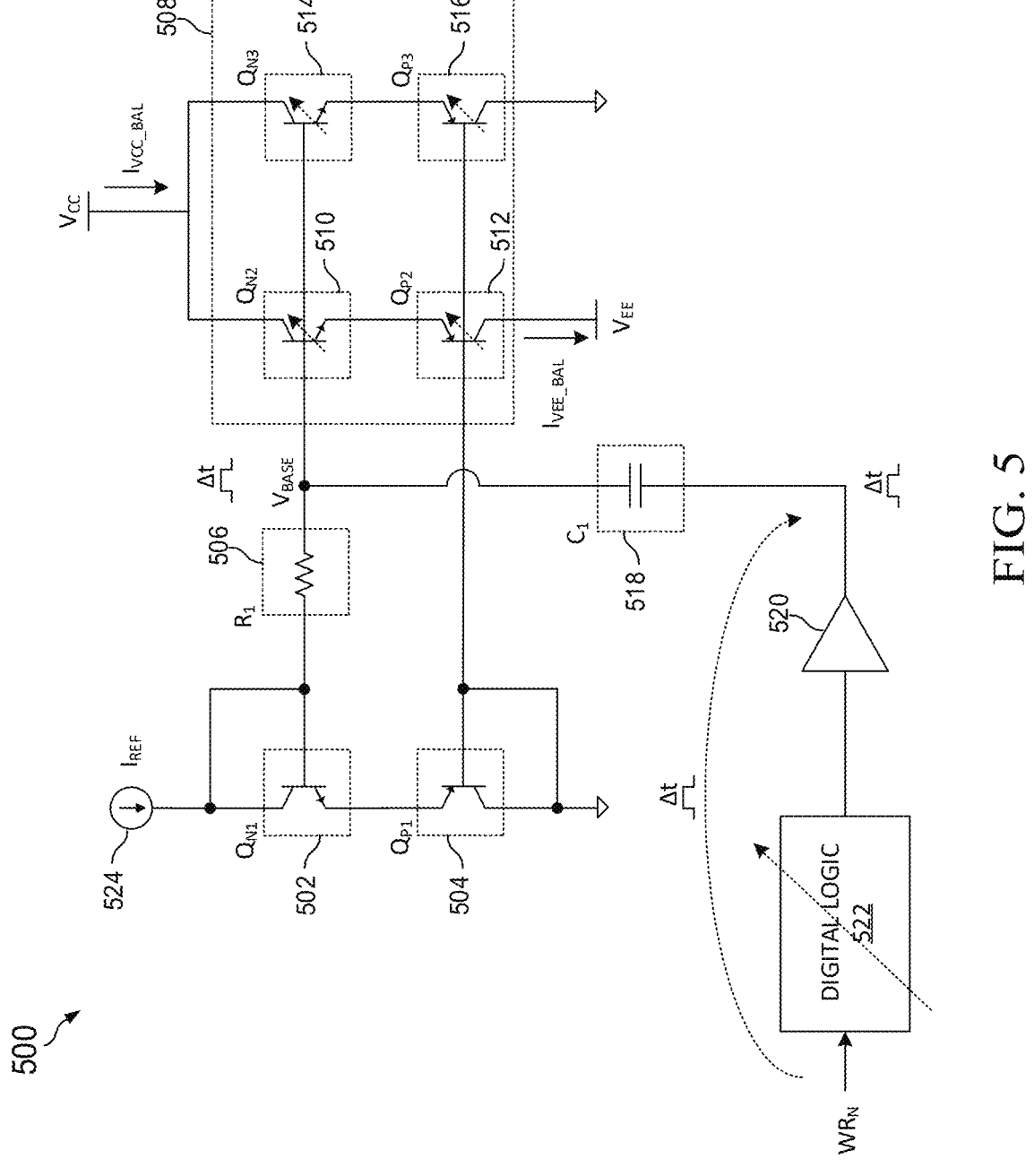
FIG. 5 is a schematic of an embodiment ballast circuit.

FIG. 5 illustrates a schematic of an embodiment ballast circuit 500, which can be implemented as the ballast circuit 302. The ballast circuit 500 includes an n-channel transistor ($Q_{N_1}$) 502, a p-channel transistor ($Q_{P_1}$) 504, a resistor ($R_1$) 506, a configurable current mirror circuit 508, a capacitor ($C_1$) 518, an optional digital buffer 520, a digital logic 522, and a reference current ($I_{REF}$), which may (or may not) be arranged as shown. The ballast circuit 500 may include additional components not shown, such as a controller and memory storage.

The input of the digital logic 522 is coupled to the write pin ($WR_N$), which is the input pin to the pre-amplifier 208. The propagation delay ($\Delta t_1$) is the propagation delay for a signal at the write pin ($WR_N$) to traverse through the writer circuit 100 and arrive at the driving structure (i.e., the first drive circuit 122, the second drive circuit 124, the third drive circuit 126, and the fourth drive circuit 128).

The output of the digital logic 522 is coupled to the base node ($V_{BASE}$) through the capacitor ($C_1$) 518. The digital logic 522 receives the write enable signal ($WR_N$) as an input and generates a pulse with a programmable duration ($\Delta t$). In embodiments, the programmable duration ($\Delta t$) is tunable through selection bits in the digital logic 522, allowing it to match the propagation delay ($\Delta t_1$) of the writer circuit 100.

In embodiments, the digital buffer 520 drives the capacitor ($C_1$) 518 to create a pulse on the output current. In embodiments, the digital buffer 520 is implemented within the digital logic 522.

When the signal at the write pin ($WR_N$) toggles, indicating the start of a write operation, the digital logic 522 creates a positive pulse at the bottom of the capacitor ($C_1$) 518. The positive pulse is coupled to the base node ($V_{BASE}$), pulling it up and forcing a higher current to flow from the positive supply voltage ($V_{CC}$) to the negative supply voltage ($V_{EE}$) through the configurable current mirror circuit 508. The increased current flow generates the positive ballast current ($I_{VCC\_BAL}$) and the negative ballast current ($I_{VEE\_BAL}$), which are injected into the supply voltages to disturb them intentionally.

By matching the programmable duration ($\Delta t$) of the pulse generated by the digital logic 522 with the propagation delay ($\Delta t_1$) of the writer circuit 100, the ballast current pulses are timed correctly to coincide with the switching of the writer circuit 100, effectively pre-charging the supply network and reducing the initial phase shifting in the output current ($I_{OUT}$).

In embodiments, the pulse generated by the digital logic 522 at its output (provided to the capacitor ($C_1$) 518) is timed to transition high (rising edge) when the signal at the write pin ($WR_N$) toggles, indicating a read-to-write transition. The pulse is then timed to transition low (falling edge) after the passage of a duration equal to the propagation delay ($\Delta t_1$) of the writer circuit 100. The pulse is then passed to the base node ($V_{BASE}$).

Each of the n-channel transistor ($Q_{N_1}$) 502 and the p-channel transistor ($Q_{P_1}$) 504 is arranged as a diode-connected transistor. The current path of the n-channel transistor ($Q_{N_1}$) 502 is between the reference current ($I_{REF}$) 524 and the p-channel transistor ($Q_{P_1}$) 504. The current path of the p-channel transistor ($Q_{P_1}$) 504 is between the n-channel transistor ($Q_{N_1}$) 502 and ground.

This reference current from the reference current ($I_{REF}$) source 502 sets the base current level for the configurable current mirror circuit 508, which is then scaled by the transistors of the configurable current mirror circuit 508 to generate the desired ballast current amplitudes. The reference current can be generated using a dedicated current reference circuit or derived from an existing bias current in the system.

In embodiments, the configurable current mirror circuit 508 includes a first configurable n-channel transistor ($Q_{N_2}$) 510, a first configurable p-channel transistor ($Q_{P_2}$) 512, a second configurable n-channel transistor ($Q_{N_3}$) 514, and a second configurable p-channel transistor ($Q_{P_3}$) 516.

The current path of the first configurable n-channel transistor ($Q_{N_2}$) 510 is between the positive supply voltage ($V_{CC}$) and the first configurable p-channel transistor ($Q_{P_2}$) 512. The current path of the first configurable p-channel transistor ($Q_{P_2}$) 512 is between the first configurable n-channel transistor ($Q_{N_2}$) 510 and the negative supply voltage ($V_{EE}$).

The control terminal of the first configurable n-channel transistor ($Q_{N_2}$) 510 and the second configurable n-channel transistor ($Q_{N_3}$) 514 is coupled to the base node ($V_{BASE}$). The resistor ($R_1$) 506 has a first terminal coupled to the control terminal of the n-channel transistor ($Q_{N_1}$) 502 and a second terminal coupled to the base node ($V_{BASE}$). The control terminals of the p-channel transistor ($Q_{P_1}$) 504, the first configurable p-channel transistor ($Q_{P_2}$) 512, and the fourth configurable p-channel transistor ($Q_{P_3}$) 516 are coupled to a common node.

The configurable current mirror circuit 508 is configured to individually generate the positive ballast current ($I_{VCC\_BAL}$) and the negative ballast current ($I_{VEE\_BAL}$) with adjustable amplitudes. The configurable current mirror circuit 508 allows tuning the current gain (i.e., the overall amount of current) through dedicated selection bits. Accordingly, the overall amount of current flowing from the positive supply voltage ($V_{CC}$) to the negative supply voltage ($V_{EE}$) can be adjusted to manage any imbalance at the positive ballast current ($I_{VCC\_BAL}$) and the negative ballast current ($I_{VEE\_BAL}$).

By providing a configurable current mirror circuit 508 and a programmable digital logic 522, the ballast circuit 500 offers flexibility in adjusting the amplitude and timing of the ballast current pulses. This allows the ballast circuit 500 to be optimized for different writer circuit designs and operating conditions. This ensures optimal performance in reducing supply voltage fluctuations and minimizing phase shifting in the output current.

The selection bits configuring the configurable current mirror circuit 508 and the digital logic 522 can be stored in registers or memory elements within the ballast circuit 500 or provided by an external control circuit. These selection bits allow dynamic adjustment of the ballast current amplitudes and the operating delay, enabling the system to adapt to changing operating conditions or compensate for process variations.

The values of the capacitor ($C_1$) 518 and the resistor ($R_1$) 506 can be chosen to ensure proper pulse shaping and coupling of the digital pulse to the current mirror circuit. The capacitor ($C_1$) 518 acts as a DC-blocking element, allowing only the AC components of the digital pulse to pass through. At the same time, the resistor ($R_1$) 506 helps to control the pulse shape and limit current draw.

The ballast circuit 500 can be implemented as an integrated circuit block within the same chip as the writer circuit 100 or as a separate component mounted in close proximity to the writer circuit 100. The implementation choice can depend on factors such as the available chip area, power budget, and the required level of integration between the ballast circuit 302 and the writer circuit 100.

Although not explicitly shown, the ballast circuit 500 or the digital logic 522 can include internal registers or memory elements that store the various selection bits. The selection bits provided or stored in the digital logic 522 can be used to select different tap points in a delay chain or control the pulse-width modulation circuit's duty cycle. By modifying the values of these selection bits, either through hardwired connections or programmable registers, the pulse duration generated by the digital logic 522 can be tuned to match the propagation delay ($\Delta t_1$) of the writer circuit 100.

In embodiments, the digital logic 522 has the same circuitry included in the writer circuit 100 up to the driving structure (i.e., the first drive circuit 122, the second drive circuit 124, the third drive circuit 126, or the fourth drive circuit 128). However, implementing the digital logic 522 is non-limiting, and other approaches, such as a delay chain, are contemplated in other embodiments.

In embodiments, the amplitude of the positive ballast current ($I_{VCC\_BAL}$) and the negative ballast current ($I_{VEE\_BAL}$) can be adjusted through the configurable current mirror circuit 508 based on the write operation performance. The performance can be evaluated by measuring the bit error rate of the written data. For example, after writing data to a track, that same track can be read back to determine if the bit error rate meets system specifications. If the bit error rate is higher than desired, the ballast current amplitudes can be adjusted through the configurable current mirror circuit 508 to optimize the write performance.

In embodiments, a ring oscillator can be used to monitor the programmable duration ($\Delta t$) of the pulse generated by the digital logic 522, which can then be compared with the propagation delay ($\Delta t_1$) of the writer circuit 100. In embodiments, one or more settings for the digital logic 522 can be trimmed during manufacturing.

In embodiments, the ballast circuit 500 can include a ring oscillator to monitor and verify the programmable duration ($\Delta t$) of the pulse generated by the digital logic 522. The ring oscillator provides a reference timing signal that can be compared with the propagation delay ($\Delta t_1$) of the writer circuit 100. This comparison allows for real-time monitoring of the timing relationship between the ballast circuit 500 and the writer circuit 100. The ring oscillator can be used during initial calibration or during operation to ensure that the programmable duration ($\Delta t$) remains properly matched to the propagation delay ($\Delta t_1$). If any misalignment is detected, the selection bits controlling the digital logic 522 can be adjusted to maintain optimal timing of the ballast current pulses. This monitoring and adjustment capability can help ensure consistent performance of the ballast circuit 500 across different operating conditions and over time.

Figure 6:
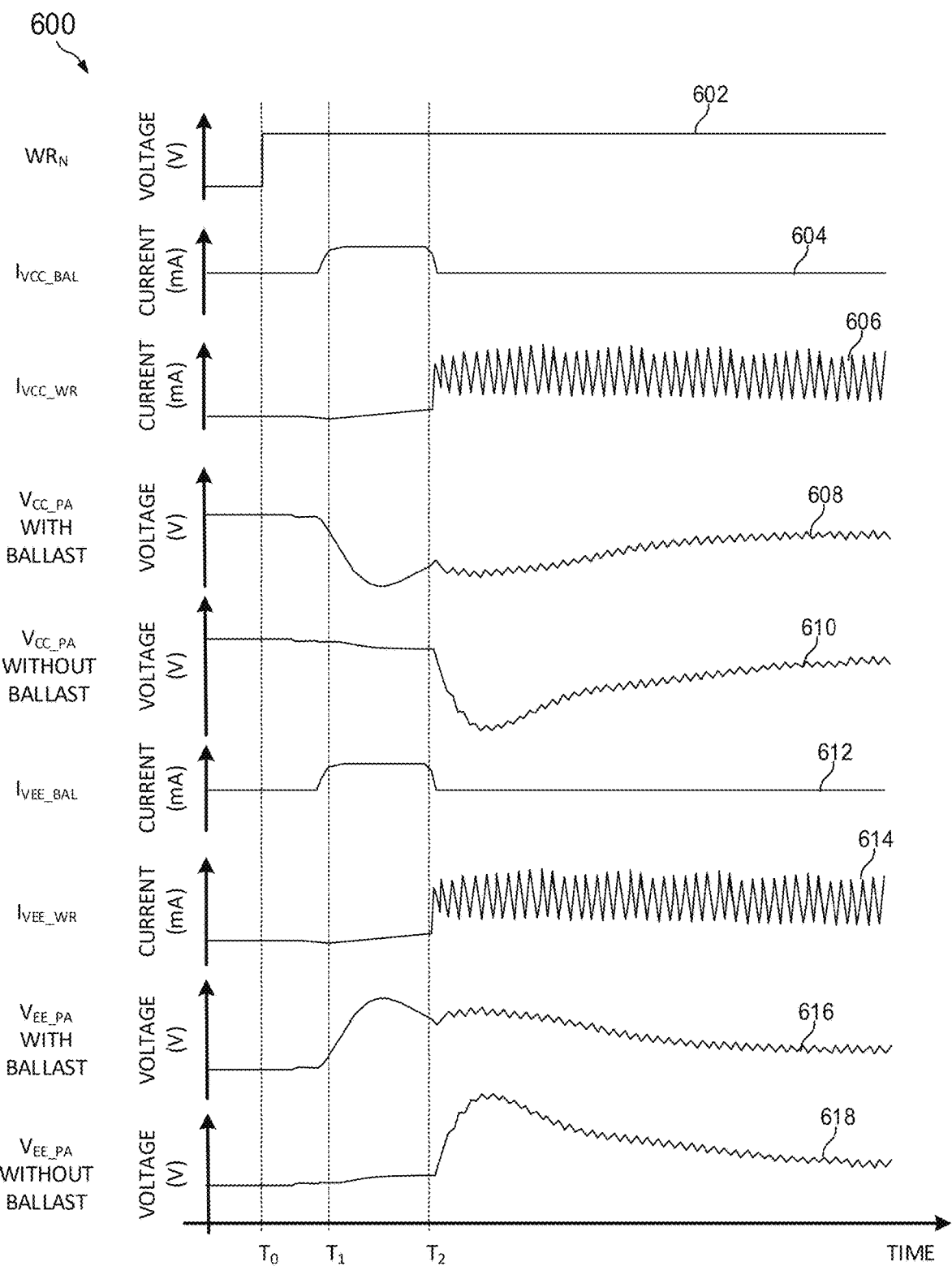
FIG. 6 is a timing diagram comparing the operation of the writer circuit with and without the ballast circuit.

FIG. 6 illustrates a timing diagram 600 comparing the operation of the writer circuit 100 with and without the ballast circuit 302. The timing diagram 600 shows the relationship between various currents and voltages in the system over time, demonstrating the effectiveness of the ballast circuit 302 in stabilizing supply voltages during write operations.

The timing diagram 600 highlights three time points in the operation of the system. At time $T_0$, the write enable signal ($WR_N$) 602 transitions, indicating the start of a write operation. When the ballast circuit 302 is present, at time $T_1$ it responds to this transition by generating the positive ballast current ($I_{VCC\_BAL}$) 604 and the negative ballast current ($I_{VEE\_BAL}$) 612. These ballast currents begin the pre-conditioning phase of the supply network.

At time $T_2$, the ballast circuit 302 de-asserts its ballast currents while the writer circuit 100 begins its internal transitions. During this period between $T_1$ and $T_2$, the writer circuit 100 activates its internal components, but has not yet begun drawing significant current from the supply voltages. This interval allows the supply network to settle from the effects of the ballast currents before the writer circuit 100 begins its operation.

At time $T_2$, the writer circuit 100 begins drawing the positive write current ($I_{VCC\_WR}$) 606 and the negative write current ($I_{VEE\_WR}$) 614 from the supply voltages. Without the ballast circuit 302, the positive pre-amplifier supply voltage ($V_{CC\_PA}$) 610 experiences a significant drop and the negative pre-amplifier supply voltage ($V_{EE\_PA}$) 618 shows a corresponding rise at time $T_2$, due to the sudden current demand. However, with the ballast circuit 302, the pre-conditioning performed between $T_1$ and $T_2$ results in the positive pre-amplifier supply voltage ($V_{CC\_PA}$) 608 and negative pre-amplifier supply voltage ($V_{EE\_PA}$) 616 remaining more stable when the writer circuit 100 begins drawing current at time $T_2$.

The timing relationships between $T_0$, $T_1$, and $T_2$ are coordinated to optimize the pre-conditioning effect. The interval between $T_0$ and $T_1$ matches the propagation delay of the writer circuit 100, ensuring the ballast currents have sufficient time to pre-charge the supply network. The interval between $T_1$ and $T_2$ provides a settling period, preventing interference between the ballast currents and the writer circuit's currents.

The write enable signal ($WR_N$) 602 initiates the write operation at time $T_0$. In response to this transition, the ballast circuit 302—when available—generates the positive ballast current ($I_{VCC\_BAL}$) 604 and the negative ballast current ($I_{VEE\_BAL}$) 612. These ballast currents are active between time $T_1$ and time $T_2$, intentionally disturbing the positive supply voltage ($V_{CC}$) and the negative supply voltage ($V_{EE}$) before the writer circuit 100 begins its operation.

At time $T_2$, the writer circuit 100 draws the positive write current ($I_{VCC\_WR}$) 606 and the negative write current ($I_{VEE\_WR}$) 614. The timing diagram 600 shows how the supply voltages respond differently with and without the ballast circuit 302. Without the ballast circuit 302, at time $T_2$, the positive pre-amplifier supply voltage ($V_{CC\_PA}$) 610 experiences a significant drop, while the negative pre-amplifier supply voltage ($V_{EE\_PA}$) 618 shows a corresponding rapid rise due to the sudden current demand.

In contrast, when the ballast circuit 302 is active, the positive pre-amplifier supply voltage ($V_{CC\_PA}$) 608 and the negative pre-amplifier supply voltage ($V_{EE\_PA}$) 616 exhibit much more stable behavior from time $T_2$. The pre-conditioning of the supply network from time $T_1$ to time $T_2$ by the ballast currents results in smaller voltage fluctuations and faster recovery times when the writer circuit 100 begins drawing current at time $T_1$.

The timing diagram 600 demonstrates how the ballast circuit 302 effectively manages the supply voltage disturbances by forcing them to occur during a controlled period between $T_1$ and $T_2$, before the writer circuit 100 becomes active at time $T_2$. This pre-conditioning ensures that when the writer circuit 100 begins delivering current to the load at time $T_2$, it operates with more stable supply voltages, reducing the phase shifting in the output current and improving overall system performance.

The improvement in supply voltage stability can be seen by comparing the voltage waveforms with and without the ballast circuit 302. The positive pre-amplifier supply voltage ($V_{CC\_PA}$) 608 with the ballast circuit 302 shows significantly less voltage drop than the positive pre-amplifier supply voltage ($V_{CC\_PA}$) 610 over time (after time $T_2$) without the ballast circuit 302. Similarly, the negative pre-amplifier supply voltage ($V_{EE\_PA}$) 616 with the ballast circuit 302 exhibits reduced voltage variation over time (after time $T_2$) compared to the negative pre-amplifier supply voltage ($V_{EE\_PA}$) 618 without the ballast circuit 302.

The effectiveness of the ballast circuit 302 in reducing phase shifting can be quantified through measurements of the output current timing. For example, in one embodiment, without the ballast circuit 302, the phase shifting in the output current can vary significantly, ranging from −6 to 25 picoseconds relative to the ideal crossing points. When the ballast circuit 302 is active, the phase shifting range is substantially reduced, varying only from −5 to 8 picoseconds. This improvement in phase shifting represents a significant enhancement in the writer circuit's timing accuracy, particularly during the critical initial clock writing period. The reduced phase shifting range helps ensure more precise data writing and contributes to lower bit error rates in the hard disk drive system.

Ideally, it would be advantageous to activate the ballast circuit 302 earlier to improve the response of the positive pre-amplifier supply voltage ($V_{CC\_PA}$) 610 and the negative pre-amplifier supply voltage ($V_{EE\_PA}$) 618. However, given the quick transition from read to write in the hard disk drive, the ballast circuit 302 this may not be practical. In these situations, the ballast circuit 302 is activated shortly before time $T_2$ (e.g., 5 to 10 ns), which may not completely compensate for the drop on the supply voltages. Accordingly, theoretically, the response can be improved by an earlier activation of the ballast circuit 302.

Figure 7:
FIG. 7 is a flowchart of an embodiment method for operating a hard disk drive pre-amplifier circuit.
Figure 7:
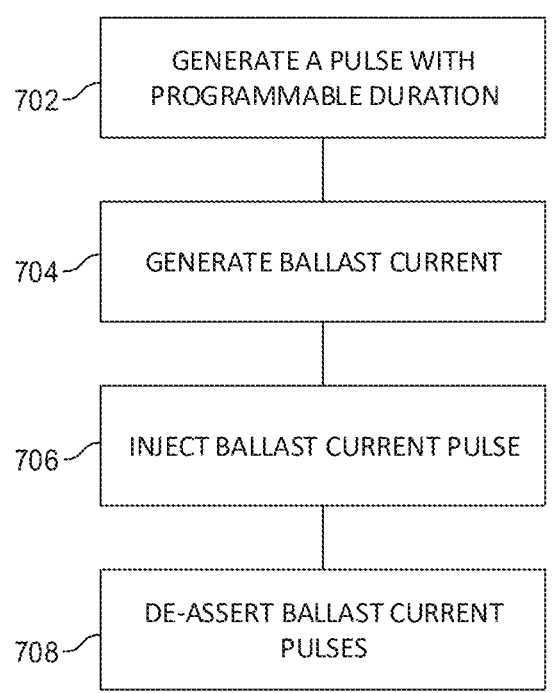

FIG. 7 illustrates a flowchart of an embodiment method 700 for operating a hard disk drive pre-amplifier circuit. It is noted that all steps outlined in the method are not necessarily required and can be optional. Further, changes to the arrangement of the steps, removal of one or more steps and path connections, and addition of steps and path connections are similarly contemplated.

At step 702, a pulse is generated having a programmable duration in response to a write enable signal. The programmable duration is selected to match a propagation delay of a writer circuit, such as the writer circuit 100. This propagation delay represents the time required for a signal to travel from the write enable signal input through the writer circuit's logic chains and digital-to-analog converters to reach the driving stage.

This pulse generation can be performed by a digital logic circuit, such as digital logic 522, which receives the write-enabled signal indicating the start of a write operation. The digital logic circuit can generate the pulse with a rising edge coinciding with a transition of the write enable signal and a falling edge after the programmable duration. In embodiments, the digital logic circuit can be implemented with matching circuitry to the writer circuit to match the propagation delay.

At step 704, a first ballast current pulse is generated from a first supply voltage and a second ballast current pulse is generated from a second supply voltage in response to the pulse. The first supply voltage can be a positive supply voltage ($V_{CC}$) and the second supply voltage can be a negative supply voltage ($V_{EE}$).

In embodiments, the ballast current pulses are generated using a configurable current mirror circuit and are designed to stabilize the positive pre-amplifier supply voltage ($V_{CC\_PA}$) and the negative pre-amplifier supply voltage ($V_{EE\_PA}$) provided to the writer circuit.

The configurable current mirror circuit scales a reference current to generate the ballast current pulses with adjustable amplitudes. The amplitude of the ballast current pulses can be adjusted by setting the biasing of the transistors using selection bits stored in memory, allowing for optimization of the ballast current levels. In embodiments, these amplitudes can be adjusted based on measured bit error rates of data written by the writer circuit.

At step 706, the first and second ballast current pulses are injected into the positive pre-amplifier supply voltage ($V_{CC\_PA}$) and the negative pre-amplifier supply voltage ($V_{EE\_PA}$) before the writer circuit draws a write current. The injection of the ballast current pulses pre-charges parasitic inductances in the supply network, preparing the supply voltages for the upcoming current demand from the writer circuit.

The injection of ballast current pulses can reduce the phase shifting range of the write current. This is particularly important when the write current is used to write clock data to a magnetic disk during the initial phase of a write operation.

At step 708, the first and second ballast current pulses are de-asserted when the writer circuit begins drawing the write current. This de-assertion is timed to coincide with the writer circuit's current demand, reducing phase shifting in the write current caused by disturbances in the first and second supply voltages.

Figure 8:
FIG. 8 is a block diagram of a pre-amplifier that is placed on the disk drive head stack assembly of a hard disk drive.
Figure 8:
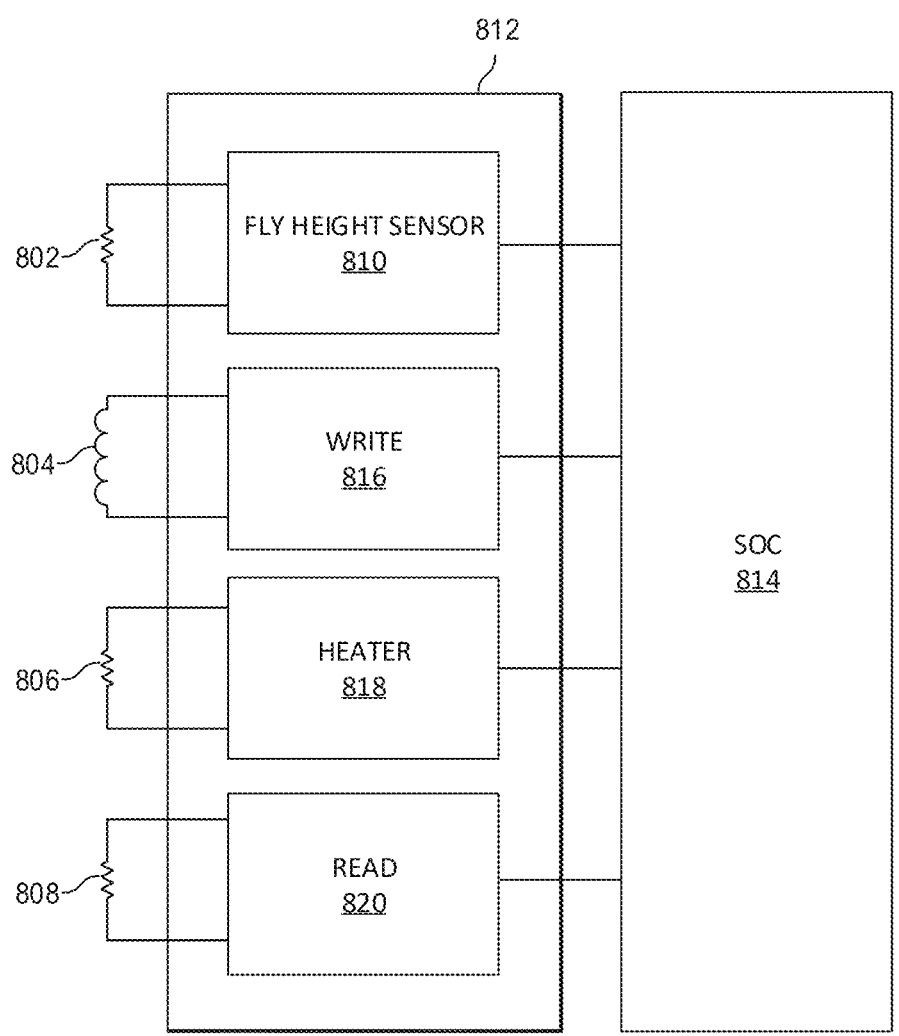

FIG. 8 illustrates a block diagram of a pre-amplifier 812 that is placed on the disk drive head stack assembly of a hard disk drive. In embodiments, the writer circuit 100 is implemented as the write circuit 816 of the pre-amplifier 812.

The disk drive head stack assembly slides over the disk. The pre-amplifier 812 includes a fly height sensor 810. In embodiments, the fly height sensor 810 includes a biasing circuit and an amplifier (not shown). The fly height sensor 810 is coupled to a resistive sensor 802. The resistive sensor 802 monitors the fly height between the disk drive head and the disk itself.

A write coil 804 is coupled to the write circuit 816 (for writing to the disk), a heater resistor 806 is coupled to the heater circuit 818 (for controlling the fly height spacing), and a read resistor 808 is coupled to the read circuit 820 (for reading from the disk). The fly height sensor 810, write circuit 816, heater circuit 818, and read circuit 820 are coupled to a silicon-on-chip (SoC) 814 for processing.

A first aspect relates to a system, comprising a writer circuit of a pre-amplifier, the writer circuit coupled between a first pre-amplifier supply voltage and a second pre-amplifier supply voltage and configured to generate a write current; and a ballast circuit coupled in parallel with the writer circuit, the ballast circuit coupled between a first supply voltage and a second supply voltage and configured to generate first and second ballast currents in response to a write enable signal, inject the first and second ballast currents into the first and second pre-amplifier supply voltages to pre-charge parasitic inductances before the writer circuit generates the write current, and de-assert the first and second ballast currents in response to the writer circuit generating the write current.

In a first implementation form of the system, according to the first aspect as such, the ballast circuit comprises a programmable delay circuit configured to generate a timing pulse having a duration matching a propagation delay of the writer circuit; and a configurable current mirror circuit configured to generate the first and second ballast currents in response to the timing pulse.

In a second implementation form of the system, according to the first aspect as such or any preceding implementation form of the first aspect, the configurable current mirror circuit comprises a plurality of selectable transistors configured to adjust amplitudes of the first and second ballast currents based on stored selection bits.

In a third implementation form of the system, according to the first aspect as such or any preceding implementation form of the first aspect, the programmable delay circuit comprises circuitry matching the writer circuit to replicate the propagation delay.

In a fourth implementation form of the system, according to the first aspect as such or any preceding implementation form of the first aspect, the first supply voltage and the second supply voltage are generated by a power supply circuit, and wherein the first pre-amplifier supply voltage and the second pre-amplifier supply voltage are derived from the first supply voltage and the second supply voltage through a flex circuit.

In a fifth implementation form of the system, according to the first aspect as such or any preceding implementation form of the first aspect, the writer circuit comprises a plurality of logic chains configured to receive differential data; and an output stage coupled with the plurality of logic chains and configured to generate the write current based on the differential data.

In a sixth implementation form of the system, according to the first aspect as such or any preceding implementation form of the first aspect, the ballast circuit is configured to monitor bit error rates of data written by the writer circuit and adjust amplitudes of the first and second ballast currents based on the monitored bit error rates.

A second aspect relates to a method, comprising generating first and second ballast currents from a first supply voltage and a second supply voltage in response to a write enable signal; injecting the first and second ballast currents into first and second pre-amplifier supply voltages to pre-charge parasitic inductances before a writer circuit of a pre-amplifier generates a write current, wherein the writer circuit is coupled between the first pre-amplifier supply voltage and the second pre-amplifier supply voltage; and de-asserting the first and second ballast currents in response to the writer circuit generating the write current.

In a first implementation form of the method, according to the second aspect as such, generating the first and second ballast currents comprises generating a timing pulse having a duration matching a propagation delay of the writer circuit; and generating the first and second ballast currents using a configurable current mirror circuit in response to the timing pulse.

In a second implementation form of the method, according to the second aspect as such or any preceding implementation form of the second aspect, generating the timing pulse comprises implementing matching circuitry to replicate the propagation delay of the writer circuit.

In a third implementation form of the method, according to the second aspect as such or any preceding implementation form of the second aspect, generating the first and second ballast currents comprises adjusting amplitudes of the first and second ballast currents using selectable transistors in the configurable current mirror circuit based on stored selection bits.

In a fourth implementation form of the method, according to the second aspect as such or any preceding implementation form of the second aspect, the first supply voltage and the second supply voltage are generated by a power supply circuit; and the first pre-amplifier supply voltage and the second pre-amplifier supply voltage are derived from the first supply voltage and the second supply voltage through a flex circuit.

In a fifth implementation form of the method, according to the second aspect as such or any preceding implementation form of the second aspect, the method further comprising monitoring bit error rates of data written by the writer circuit; and adjusting amplitudes of the first and second ballast currents based on the monitored bit error rates.

In a sixth implementation form of the method, according to the second aspect as such or any preceding implementation form of the second aspect, the writer circuit receives differential data through a plurality of logic chains and generates the write current based on the differential data using an output stage.

A third aspect relates to a ballast circuit, comprising a programmable delay circuit configured to receive a write enable signal, and generate a timing pulse having a duration matching a propagation delay of a writer circuit; and a configurable current mirror circuit coupled between a first supply voltage and a second supply voltage, the configurable current mirror circuit configured to generate first and second ballast currents in response to the timing pulse, inject the first and second ballast currents into first and second pre-amplifier supply voltages to pre-charge parasitic inductances before the writer circuit generates a write current, and de-assert the first and second ballast currents in response to the writer circuit generating the write current.

In a first implementation form of the ballast circuit, according to the third aspect as such, the configurable current mirror circuit comprises a first set of selectable transistors coupled between the first supply voltage and a base node; a second set of selectable transistors coupled between the base node and the second supply voltage; and a reference current source coupled to the first and second sets of selectable transistors.

In a second implementation form of the ballast circuit, according to the third aspect as such or any preceding implementation form of the third aspect, the ballast circuit further comprising a memory configured to store selection bits for controlling the first and second sets of selectable transistors to adjust amplitudes of the first and second ballast currents.

In a third implementation form of the ballast circuit, according to the third aspect as such or any preceding implementation form of the third aspect, the ballast circuit further comprising a capacitor coupled between an output of the programmable delay circuit and the configurable current mirror circuit.

In a fourth implementation form of the ballast circuit, according to the third aspect as such or any preceding implementation form of the third aspect, the programmable delay circuit comprises matching circuitry configured to replicate the propagation delay of the writer circuit.

In a fifth implementation form of the ballast circuit, according to the third aspect as such or any preceding implementation form of the third aspect, the ballast circuit further comprising a monitoring circuit configured to monitor bit error rates of data written by the writer circuit, and adjust the configurable current mirror circuit based on the monitored bit error rates.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A system, comprising:
   a writer circuit of a pre-amplifier, the writer circuit coupled between a first pre-amplifier supply voltage and a second pre-amplifier supply voltage and configured to generate a write current; and
   a ballast circuit coupled in parallel with the writer circuit, the ballast circuit coupled between a first supply voltage and a second supply voltage and configured to:
   generate first and second ballast currents in response to a write enable signal,
   inject the first and second ballast currents into the first and second pre-amplifier supply voltages to pre-charge parasitic inductances before the writer circuit generates the write current, and
   de-assert the first and second ballast currents in response to the writer circuit generating the write current.

2. The system of claim 1, wherein the ballast circuit comprises:
   a programmable delay circuit configured to generate a timing pulse having a duration matching a propagation delay of the writer circuit; and a configurable current mirror circuit configured to generate the first and second ballast currents in response to the timing pulse.

3. The system of claim 2, wherein the configurable current mirror circuit comprises a plurality of selectable transistors configured to adjust amplitudes of the first and second ballast currents based on stored selection bits.

4. The system of claim 2, wherein the programmable delay circuit comprises circuitry matching the writer circuit to replicate the propagation delay.

5. The system of claim 1, wherein the first supply voltage and the second supply voltage are generated by a power supply circuit, and wherein the first pre-amplifier supply voltage and the second pre-amplifier supply voltage are derived from the first supply voltage and the second supply voltage through a flex circuit.

6. The system of claim 1, wherein the writer circuit comprises:
   a plurality of logic chains configured to receive differential data; and
   an output stage coupled to the plurality of logic chains and configured to generate the write current based on the differential data.

7. The system of claim 1, wherein the ballast circuit is configured to monitor bit error rates of data written by the writer circuit and adjust amplitudes of the first and second ballast currents based on the monitored bit error rates.

8. A method, comprising:
   generating first and second ballast currents from a first supply voltage and a second supply voltage in response to a write enable signal;
   injecting the first and second ballast currents into first and second pre-amplifier supply voltages to pre-charge parasitic inductances before a writer circuit of a pre-amplifier generates a write current, wherein the writer circuit is coupled between the first pre-amplifier supply voltage and the second pre-amplifier supply voltage; and
   de-asserting the first and second ballast currents in response to the writer circuit generating the write current.

9. The method of claim 8, wherein generating the first and second ballast currents comprises:
   generating a timing pulse having a duration matching a propagation delay of the writer circuit; and
   generating the first and second ballast currents using a configurable current mirror circuit in response to the timing pulse.

10. The method of claim 9, wherein generating the timing pulse comprises implementing matching circuitry to replicate the propagation delay of the writer circuit.

11. The method of claim 9, wherein generating the first and second ballast currents comprises adjusting amplitudes of the first and second ballast currents using selectable transistors in the configurable current mirror circuit based on stored selection bits.

12. The method of claim 8, wherein:
   the first supply voltage and the second supply voltage are generated by a power supply circuit; and
   the first pre-amplifier supply voltage and the second pre-amplifier supply voltage are derived from the first supply voltage and the second supply voltage through a flex circuit.

13. The method of claim 8, further comprising:
   monitoring bit error rates of data written by the writer circuit; and
   adjusting amplitudes of the first and second ballast currents based on the monitored bit error rates.

14. The method of claim 8, wherein the writer circuit receives differential data through a plurality of logic chains and generates the write current based on the differential data using an output stage.

15. A ballast circuit, comprising:
   a programmable delay circuit configured to:
      receive a write enable signal, and
      generate a timing pulse having a duration matching a propagation delay of a writer circuit; and
   a configurable current mirror circuit coupled between a first supply voltage and a second supply voltage, the configurable current mirror circuit configured to:
      generate first and second ballast currents in response to the timing pulse,
      inject the first and second ballast currents into first and second pre-amplifier supply voltages to pre-charge parasitic inductances before the writer circuit generates a write current, and
      de-assert the first and second ballast currents in response to the writer circuit generating the write current.

16. The ballast circuit of claim 15, wherein the configurable current mirror circuit comprises:
   a first set of selectable transistors coupled between the first supply voltage and a base node;
   a second set of selectable transistors coupled between the base node and the second supply voltage; and
   a reference current source coupled to the first and second sets of selectable transistors.

17. The ballast circuit of claim 16, further comprising a memory configured to store selection bits for controlling the first and second sets of selectable transistors to adjust amplitudes of the first and second ballast currents.

18. The ballast circuit of claim 15, further comprising a capacitor coupled between an output of the programmable delay circuit and the configurable current mirror circuit.

19. The ballast circuit of claim 15, wherein the programmable delay circuit comprises matching circuitry configured to replicate the propagation delay of the writer circuit.

20. The ballast circuit of claim 15, further comprising a monitoring circuit configured to:
   monitor bit error rates of data written by the writer circuit, and
   adjust the configurable current mirror circuit based on the monitored bit error rates.

* * * * *